United States Patent Office 2,945,876
Patented July 19, 1960

2,945,876

VITAMIN A INTERMEDIATES AND PROCESS FOR OBTAINING SAME

Howard C. Klein, Brooklyn, N.Y., assignor to Nopco Chemical Company, Harrison, N.J., a corporation of New Jersey No Drawing. Filed Sept. 4, 1957, Ser. No. 681,899

15 Claims. (Cl. 260—456)

This invention relates to the preparation of vitamin A and more specifically, relates to the preparation of intermediate compounds which can be employed in the preparation of vitamin A.

The synthesis of vitamin A has engaged the attention of the art since the structure of vitamin A was first disclosed by Karrer in 1933. Many routes for the synthesis of vitamin A have been advanced and a considerable body of literature has been developed concerning the preparation of vitamin A, vitamin A active materials and vitamin A intermediates. Because of the demand for vitamin A and the market which exists for this compound, efforts are constantly being made to devise new and improved methods both for the total synthesis of vitamin A and for the preparation of intermediate compounds which can be employed in the production of vitamin A.

Accordingly, it is an object of the present invention to provide an improved method for obtaining vitamin A.

It is a more particular object of this invention to provide a novel and effective method for the production of valuable intermediates useful in the production of vitamin A.

It is a further object to prepare new compounds in a high state of purity which are useful as intermediates in the preparation of vitamin A.

Further objects will become apparent from the detailed description given hereinafter. It is intended, however, that the detailed description and the specific examples do not limit the invention, but merely indicate the preferred embodiments thereof since various changes and modifications within the scope of the invention will become apparent to those skilled in the art.

It has been discovered that the above and other objects can be achieved by the preparation of crystalline quaternary salts of a vitamin A active organic amine referred to hereinafter as Compound IV. The preparation of Compound IV is described in U.S. Patent No. 2,819,310 Klein, Beckmann and Schaaf and U.S. Patent No. 2,819,308 Schaaf, Klein and Kapp, both issued on January 7, 1958. In brief, either the cis or trans form of a material having the empirical formula $C_{20}H_{30}O$ and the structural formula

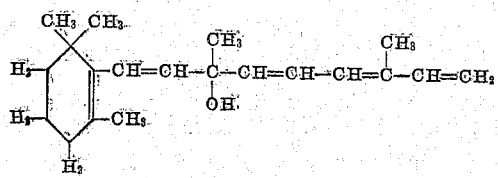

which compound contains the beta ionone ring structure, four ethylenic bonds and one hydroxyl group, and which in the trans configuration has an absorption maximum in the ultra-violet at 2710 A., a molecular extinction coefficient at that wave length of 29,100 and has a refractive index at 20° C. of 1.552 and which in the cis configuration has an absorption maximum in the ultraviolet at 2740 A., a molecular extinction coefficient at that wave length of 25,900 and has a refractive index at 16° C. of 1.535 (referred to hereinafter as Compound I), is reacted with a boron trifluoride hexamethylene tetramine complex under appropriate reaction conditions in a water-containing aromatic hydrocarbon solution or in solution in a solvent selected from the group consisting of acetone, acetonitrile, acrylonitrile, benzyl cyanide, dioxane, isopropenyl acetate and tetrahydrofuran. Thereafter, the reaction mixture is worked up with an alkaline material. The resulting product which is vitamin A active is referred to as Compound IV. Compound IV contains a hexamethylene tetramine fragment in the molecule.

Compound IV when tested biologically on rats shows a vitamin A activity of about 50%. Its ultra-violet spectrographic characteristics are practically identical with those of vitamin A; however, infra-red spectrographic analysis shows that Compound IV does not contain a hydroxyl group, but that it does contain an amine group. Analysis of Compound IV by the Kjeldahl method shows that Compound IV has a nitrogen content which is about 9.6% and is about twice the nitrogen content of vitamin A amine. Vitamin A amine has the same structure as vitamin A only the amine group has replaced the hydroxyl group of vitamin A. The 9.6% figure is also twice as large as the basic nitrogen value which is obtained by titration of this compound with approximately 0.02 N perchloric acid in glacial acetic acid. This indicates that the molecule contains more than one nitrogen atom and that not all of it is basic. Thus the physical and chemical characteristics of Compound IV indicate that it contains the vitamin A chromophoric system wherein the hydroxyl group of vitamin A has been replaced by a basic fragment similar to a major portion of the hexamethylene tetramine molecule.

Compound IV is a viscous liquid soluble in ethyl ether, ethyl alcohol, acetone and similar solvents. It has an absorption maximum in the ultra-violet region of the spectrum at 3250 A. and has at that wave length an extinction coefficient of about 1000. If it is treated with hydrobromic acid, a product is obtained which has an absorption maximum at 3300 A. Likewise treatment of Compound IV with phosphoric acid gives a product having an absorption maximum at 3280-3300 A. Presumably salts of Compound IV are formed by treatment with hydrobromic acid and phosphoric acid since treatment of the products with alkali gives in each case the original Compound IV. Acetylation of Compound IV with acetic anhydride gives a product which when analyzed by infra-red analysis shows the presence of an amide band in the infra-red spectrographic curve.

Compound IV can be converted to vitamin A amine by treating it with aluminum isopropoxide in accordance with the procedure disclosed and claimed in U.S. Patent No. 2,819,309, Klein issued January 7, 1958. Also, Compound IV can be converted into vitamin A aldehyde by treating it with iodine in accordance with the procedure disclosed and claimed in U.S. Patent No. 2,819,311, Klein and Grassetti issued January 7, 1958.

The novel crystalline quaternary salts of Compound IV are prepared by treating Compound IV with a quaternizing agent such as methyl iodide at low temperatures in the presence of a solvent inert to the aforesaid reactants. Crystals of the quaternary compound readily form and may be collected and purified by washing with non-polar organic solvents such as dimethyl ether, diethyl ether, hexane, pentane, etc., in which solvents the polar quaternary salts are highly insoluble. In this manner, very pure quaternary salts are obtained since unreacted vitamin A active organic amine, excess quaternizing agent, or impurities that arise during the quaternization process remain in solution in the non-polar organic solvent. Alternatively, the quaternary salts may be purified by rapid recrystallization from acetonitrile. This propensity of Compound IV towards formation of crystalline quaternary salts was entirely unexpected and unpredictable in view of the failure of repeated and extensive efforts to prepare such common crystalline amine salts as the picrate, hydrohalide, oxalate, citrate, maleate, tartrate, or phosphate. When attempts were made to prepare such salts, either oils were formed from which the original amine could be regenerated by alkaline treatment, or else intractable tars resulted accompanied by formation of intensely colored solutions.

The unexpected crystalline nature of the quaternary salts of the vitamin A active organic amine are of particular utility, since they serve as a means of preparing a highly pure form of Compound IV. These quaternary salts in turn serve as progenitors of vitamin A aldehyde by treatment of the quaternary salts with iodine as disclosed and claimed in U.S. patent application Serial No. 681,898, Klein and Grassetti, filed concurrently herewith. Vitamin A aldehyde may then be converted to vitamin A alcohol by reduction with lihium aluminum hydride as described by Wendler et al. J. Am. Chem. Soc. 72 234 (1950).

Other quaternizing agents may be employed besides methyl iodide, such as methyl bromide, ethyl bromide, benzyl chloride, methyl p-toluene sulfonate, dimethyl sulfate, etc. As inert solvents for forming the salts, hexane, acetone, diethyl ether, isopropyl ether, methanol, ethanol, etc., or mixtures thereof have been found to be satisfactory.

The quaternizing agent is generally added slowly to a solution of Compound IV in the course of about one-half hour at temperatures of from 0° to 15° C. Stirring during addition of the quaternizing agent is optional, although it is preferred to stir the reactants after completion of the addition for a length of time of about one to three hours. Both the addition and stirring procedures are preferably carried out in the presence of an inert atmosphere such as nitrogen.

The amount of quaternizing agent must be at least on an equivalent basis with Compound IV. However, an excess is preferred so that the reaction will proceed more rapidly. No difficulty is encountered in removing the excess since the quaternizing agent remains in solution in the solvent medium. If any excess quaternizing agent is adsorbed by the precipitate, it can be washed out with a non-polar solvent. Preferably an excess of about 10 to 35 moles of the quaternizing agent is used. The above considerations are based upon a figure of 357 taken as the approximate molecular weight of Compound IV.

It is preferred that the addition of quaternizing agent take place in a dilute solution of Compound IV, although it is of course obvious that the specific concentrations of Compound IV in a solvent, or for that matter of the concentration of the quaternizing agent in a solvent, is not critical.

Since the quaternary salt undergoes decomposition at room temperature under atmospheric conditions, it is stored under nitrogen at −10° C. in order to minimize decomposition.

For a fuller understanding of the nature and objects of the invention, reference may be had to the following examples which are given for purposes of illustration and are not to be construed in a limiting sense.

*Example I*

2.5 grams of approximately 50% pure Compound IV were dissolved in 700 ml. of hexane. This solution was in turn added with stirring to 700 ml. of acetone at 0° C. A second solution containing the quaternizing agent was prepared by dissolving 7.5 ml. (0.012 mole) of methyl iodide in 10 ml. of hexane. The methyl iodide solution was then added to the solution of Compound IV which was maintained at a temperature of 0° C. The addition was carried out during a period of one-half hour and under a nitrogen atmosphere. Following the methyl iodide addition to Compound IV, the resulting solution was stirred under a nitrogen atmosphere for one hour at 0° C. and for an additional two hours at 10° C. The crystalline quaternary compound (Compound IV methiodide) was deposited during this stirring. Thereafter, the neutral crystalline solids were filtered off, liberally washed with diethyl ether and finally dried in vacuo at room temperature. A yield of 0.915 gm. of white crystalline material was obtained.

A melting point determination was made and the material gave a sharp melting point at 152–153° C. Decomposition at this temperature was observed. This compound had an absorption maximum ($\lambda$ max) in the ultra-violet region of the spectrum at 3310 A. and an extinction coefficient $$(E_{1\,cm}^{1\%}) \text{ of } 825$$

at that wave length.

This bathochromic shift in the ultra-violet spectrum from 3250 A. (the $\lambda$ max of Compound IV) to 3310 A. of the quaternary salt is characteristics of a positively charged nitrogen atom which is present in my novel quaternary compounds. I have also found this same bathochromic shift when Compound IV has been converted e.g., to its hydrobromide and phosphate salts. An analysis of the compound of Example I disclosed 55.3% carbon, 7.22% hydrogen, 26.75% iodine, and 9.67% nitrogen.

Further purification was effected by rapid crystallization from acetonitrile yielding white rosettes having a melting point of 152.5 to 153° C. This recrystallized material had an ultra-violet absorption maximum at $$3310 \text{ A. and } E_{1\,cm}^{1\%}$$

at that wave length of 890. Further recrystallization failed to raise either the melting point or the $$E_{1\,cm}^{1\%}$$

value.

By concentration of the mother liquors of the original reaction mixture, a second crop of quaternary salt was obtained in an amount of 0.21 gm. which upon analysis disclosed a $$\lambda \text{ max} = 3310 \text{ A. and an } E_{1\,cm}^{1\%} = 445$$

A third crop of material having a $$\lambda \text{ max} = 3310 \text{ A. and an } E_{1\,cm}^{1\%} = 458$$

was obtained in an amount of 0.42 gm. by further concentration of the mother liquor.

*Example II*

To a solution of 3.2 grams of Compound IV (approximately 50% pure) in 225 ml. of hexane was added 225 ml. of acetone. A second solution of 9 ml. (0.138 mole) of methyl iodide dissolved in 10 ml. of hexane was added to the first solution of Compound IV under an atmosphere of nitrogen. Thereafter the reaction mixture was stirred under a nitrogen atmosphere at a temperature of 10° C. for 3 hours. 1.91 grams of quaternary salt (Compound IV methiodide) was recovered by filtration and washing as indicated in Example I. A melting point of 151 to 152° C. was observed. The $$\lambda \text{ max was at } 3310 \text{ A. and } E_{1\,cm}^{1\%} = 758$$

A second crop of salt was recovered. It had a melting point of 145 to 148° C., a $$\lambda \text{ max at } 3310 \text{ A. and } E_{1\,cm}^{1\%} = 622$$

A final addition of diethyl ether was made to the mother liquor until no further precipitation was observed, thus ensuring removal of the last traces of quaternary salt. The precipitate was then separated by filtration. Since the quaternary salt is slightly soluble in acetone and completely insoluble in ether, the addition of the latter brings out of solution all of the salt. After the preceding separation of the salt, the solvent mixture was evaporated and 2.08 grams of residue was found. This residue showed a λ max=3300 A. and shoulders at 3550 and 3700 A. The $E_{1\ cm.}^{1\%}$ was 1000

The 2.08 gram fraction was chromatographed in hexane over 30 grams of acid washed, water deactivated alumina. The initial fraction recovered after chromatography, upon analysis, gave the anhydro vitamin A spectrum. Subsequent hexane fractions yielded about 10% vitamin A aldehyde having a λ max=3850 A. in isopropanol and $E_{1\ cm.}^{1\%}$=582 and λ max=3700 A. in hexane and $E_{1\ cm.}^{1\%}$=670

A Kjeldahl nitrogen determination was run and zero nitrogen was found, thus showing the absence of contamination by nitrogenous impurities. The final fractions were eluted with methanol and when recovered, appeared to be the starting material i.e., Compound IV.

*Example III*

One gram of Compound IV of about 45% purity was dissolved in 200 ml. of hexane and 200 ml. of acetone. To this solution was added a solution containing 3 ml. of methyl iodide dissolved in 10 ml. of hexane. The addition took place with stirring in the course of one-half hour at a temperature of 0° C. under a nitrogen atmosphere. Thereafter the temperature of the solution was allowed to rise to room temperature and was stirred for two hours at this temperature. The solution was then cooled to 5° C. and 0.538 gm. of quaternary salt was recovered. It had a melting point of 151–152° C.

*Example IV*

1.86 grams of Compound IV (about 50% pure) was dissolved in 100 ml. of isopropyl ether. To this solution 7 ml. of methyl p-toluene sulfonate dissolved in 50 ml. of isopropyl ether was added. Both solutions were previously chilled to 5° C. An additional 2 ml. of methyl p-toluene sulfonate was added and the solution allowed to stand overnight at 5° C. The solution was filtered and extremely hygroscopic white platelets of the quaternary salt of Compound IV were collected. The λ max was found to be 3300 A. and $E_{1\ cm.}^{1\%}$=687

A Kjeldahl determination was carried out which indicated 9.1% nitrogen. The sulfur content was found to be 5.85%.

As indicated by the foregoing, very pure crystalline quaternary salts of Compound IV are obtained. The purity is very high because, while these salts are insoluble in non-polar solvents, other undesirable materials e.g., unreacted Compound I, anhydro vitamin A, unreacted Compound IV, polymeric material, excess quaternizing agent, etc., remain in solution. This high degree of purity is further demonstrated by the fact that the ultra-violet absorption spectrum of the Compound IV methiodide has been found to be smooth and the maximum very sharply defined, indicative of a highly purified product.

It will be appreciated that various modifications can be made in the invention described above and such are within the scope of the present invention as defined in the appended claims.

Having described my invention, what I claim as new and desire to secure by Letters Patent is:

1. Crystalline quaternary salts of high purity of an amine compound which has (1) vitamin A activity, (2) an absorption maximum in the ultra-violet region of the spectrum at 3250 A. and an extinction coefficient thereat of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet region of the spectrum of 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subjected to infra-red analysis, (10) when treated with iodine is converted to vitamin A aldehyde and (11) when treated with aluminum isopropoxide is converted to vitamin A amine.

2. Crystalline quaternary salts of high purity of an amine compound which has (1) vitamin A activity (2) an absorption maximum in the ultra-violet region of the spectrum at 3250 A. and an extinction coefficient thereat of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet region of the spectrum at 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subjected to infra-red analysis, (10) when treated with iodine is converted to vitamin A aldehyde and (11) when treated with aluminum isopropoxide is converted to vitamin A amine, said salts quaternized with a quaternizing agent selected from the group consisting of methyl iodide, methyl bromide, ethyl bromide, benzyl chloride, methyl p-toluene sulfonate, and dimethyl sulfate.

3. The crystalline methyl iodide quaternary salt of an amine compound said amine compound having (1) vitamin A activity, (2) an absorption maximum in the ultra-violet region of the spectrum at 3250 A. and an extinction coefficient thereof of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet region of the spectrum of 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subjected to infra-red analysis, (10) when treated with iodine is converted to vitamin A aldehyde and (11) when treated with aluminum isopropoxide is converted to vitamin A amine, said quaternary salt further characterized by having a high purity and by having a melting point of 152.5–153° C. and an absorption maximum in the ultraviolet at 3310 A.

4. The crystalline methyl para-toluene sulfonate quaternary salt of an amine compound said amine compound having (1) vitamin A activity, (2) an absorption maximum in the ultra-violet region of the spectrum at 3250 A. and an extinction coefficient thereat of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet region of the spectrum of 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subjected to infra-red analysis, (10) when treated with iodine is converted to vitamin A amine, said quaternary salt further characterized by having a high purity and by an absorption maximum in the ultra-violet at 3300 A., and containing 9.1% nitrogen and 5.85% sulfur.

5. A process for preparing crystalline quaternary salts of high purity of an amine compound which has (1) vitamin A activity, (2) an absorption maximum in the ultra-violet region of the spectrum at 3250 A., and an extinction coefficient thereat of about 1000, (3) an infra-red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet region of the spectrum of 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subjected to infra-red analysis, (10) when treated with aluminum isopropoxide is converted to vitamin A amine, comprising the steps of treating said amine compound at low temperatures with a quaternizing agent and thereafter recovering the salt.

6. The process of claim 5 in which said quaternizing agent is selected from the group consisting of methyl iodide, methyl bromide, ethyl iodide, benzyl chloride, methyl p-toluene sulfonate, and dimethyl sulfate.

7. The process of claim 5 in which said temperature is from 0 to 15° C.

8. The process of claim 7 in which there is present a solvent inert to said amine compound and said quaternizing agent.

9. The process of claim 8 in which there is present at least one mole of quaternizing agent per mole of said amine compound.

10. The process of claim 8 in which there is present from about 10 to 35 moles of said quaternizing agent per mole of said amine compound.

11. The process of claim 9 in which said quaternizing agent is added to said amine compound during a period of time of about one-half hour.

12. The process of claim 9 in which said quaternizing agent is methyl iodide.

13. The process of claim 9 including step of stirring said reactants.

14. The process of claim 13 including the step of stirring said reactants under an inert atmosphere.

15. The process of claim 9 in which said quaternizing agent is methyl p-toluene sulfonate.

References Cited in the file of this patent

UNITED STATES PATENTS

| | | |
|---|---|---|
| 2,415,834 | Milas | Feb. 18, 1947 |
| 2,770,646 | Treves | Nov. 13, 1956 |
| 2,819,308 | Schaaf et al. | Jan. 7, 1958 |
| 2,819,309 | Klein | Jan. 7, 1958 |